(12) United States Patent
Kramcha et al.

(10) Patent No.: US 12,465,426 B2
(45) Date of Patent: Nov. 11, 2025

(54) CUSTOMIZED SURGICAL GUIDES

(71) Applicant: 3D Systems, Inc., Rock Hill, SC (US)

(72) Inventors: Tarik Kramcha, Encinitas, CA (US);
Riley R. Bruce, Denver, CO (US);
Tyler John York, Lakewood, CO (US);
Shelby Marks, Golden, CO (US)

(73) Assignee: 3D Systems, Inc., Rock Hill, SC (US)

( * ) Notice: Subject to any disclaimer, the term of this patent is extended or adjusted under 35 U.S.C. 154(b) by 564 days.

(21) Appl. No.: 17/501,647

(22) Filed: Oct. 14, 2021

(65) Prior Publication Data

US 2022/0117665 A1    Apr. 21, 2022

Related U.S. Application Data

(60) Provisional application No. 63/093,825, filed on Oct. 20, 2020.

(51) Int. Cl.
*A61B 17/15* (2006.01)
*A61B 17/17* (2006.01)
(Continued)

(52) U.S. Cl.
CPC .............. *A61B 34/10* (2016.02); *A61B 17/15* (2013.01); *A61B 17/176* (2013.01); *B33Y 80/00* (2014.12);
(Continued)

(58) Field of Classification Search
CPC ....... A61B 34/10; A61B 17/15; A61B 17/176; A61B 2017/00526; A61B 2034/108
See application file for complete search history.

(56) References Cited

U.S. PATENT DOCUMENTS 5,413,579 A * 5/1995 Tom Du Toit ......... A61B 17/15
606/87
8,062,302 B2 11/2011 Lang et al.
(Continued)

FOREIGN PATENT DOCUMENTS

CN        105078586        11/2015
JP        2010-540006 A    12/2010
(Continued)

OTHER PUBLICATIONS

PCT International Search Report for International Search Authority for PCT/US2021/055001, mailed Jan. 28, 2022 (6 pages).
(Continued)

*Primary Examiner* — Tracy L Kamikawa
(74) *Attorney, Agent, or Firm* — Maynard Nexsen PC; J. Clinton Wimbish

(57) ABSTRACT

A surgical guide includes a metal guide and a plastic reference formed by additive manufacturing. The metal guide is configured to engage a bone surface of a first body area. The metal guide includes a main plate and an arm. The main plate has an inner surface customized and shaped to the bone surface. The main plate defines mounting guides for securing the main plate to the bone surface and defines a machining guide for drilling or cutting through the bone surface. The arm is formed to the main plate at a proximal end and extends to a distal end. The plastic reference has a reference surface customized and shaped to a surface of a second body area that is physically separated from the first body area.

16 Claims, 4 Drawing Sheets

(51) Int. Cl.
  *A61B 34/10* (2016.01)
  *A61C 1/08* (2006.01)
  *B33Y 80/00* (2015.01)
  *A61B 17/00* (2006.01)
  *B22F 10/28* (2021.01)
  *B22F 10/80* (2021.01)
  *B29C 64/386* (2017.01)
  *B33Y 10/00* (2015.01)
  *B33Y 50/00* (2015.01)

(52) U.S. Cl.
  CPC .............. *A61B 2017/00526* (2013.01); *A61B 2034/108* (2016.02); *A61C 1/082* (2013.01); *B22F 10/28* (2021.01); *B22F 10/80* (2021.01); *B29C 64/386* (2017.08); *B33Y 10/00* (2014.12); *B33Y 50/00* (2014.12)

(56) References Cited

U.S. PATENT DOCUMENTS

| | | | |
|---|---|---|---|
| 8,758,357 | B2 | 6/2014 | Frey |
| 8,764,441 | B2* | 7/2014 | Polley .................. A61B 17/666 606/86 R |
| 9,566,075 | B2 | 2/2017 | Carroll et al. |
| 9,662,214 | B2* | 5/2017 | Li ............................ C23C 16/44 |
| RE47,368 | E* | 4/2019 | Greenberg ........... A61B 17/176 |
| 10,426,550 | B2 | 10/2019 | Shalayev et al. |
| 2008/0199827 | A1* | 8/2008 | Kamer ............... A61C 13/0004 378/38 |
| 2012/0022604 | A1 | 1/2012 | Polley et al. |
| 2014/0180055 | A1* | 6/2014 | Glynn .................... A61M 1/84 600/407 |
| 2015/0142000 | A1 | 5/2015 | Seedhom et al. |
| 2018/0049758 | A1 | 2/2018 | Amis et al. |
| 2019/0223886 | A1 | 7/2019 | Fritzinger |
| 2019/0314127 | A1* | 10/2019 | Chen .................... A61B 17/176 |
| 2019/0336245 | A1 | 11/2019 | Liacouras et al. |
| 2019/0365393 | A1 | 12/2019 | Rhodes et al. |
| 2020/0015934 | A1* | 1/2020 | Llop .................... A61B 17/176 |
| 2021/0059691 | A1* | 3/2021 | Zille ...................... A61B 17/15 |
| 2021/0100596 | A1* | 4/2021 | Simpson .............. A61B 17/151 |
| 2022/0015861 | A1* | 1/2022 | Basta .................... A61B 90/05 |

FOREIGN PATENT DOCUMENTS

| | | |
|---|---|---|
| JP | 2015-516220 A | 6/2015 |
| KR | 20200040319 | 4/2020 |
| WO | 2011059899 A1 | 3/2011 |
| WO | 2016151000 A1 | 9/2016 |

OTHER PUBLICATIONS

PCT Written Opinion for International Search Authority for PCT/US2021/055001, mailed Jan. 28, 2022 (8 pages).

EPO translation of Korean Publication No. KR20200040319, printed on Jan. 24, 2022 (15 pages).

EPO translation of Chinese Publication No. CN105078586, printed on Jan. 24, 2022 (32 pages).

English translation of Japanese Patent Application 2023-521743, dated Mar. 26, 2024 (3 pages).

* cited by examiner

CUSTOMIZED SURGICAL GUIDES

CROSS-REFERENCE TO RELATED APPLICATIONS

This non-provisional patent application claims priority to U.S. Provisional Application Ser. No. 63/093,825, Entitled "Improved Customized Surgical Guides" by Tarik Kramcha, filed on Oct. 20, 2020, incorporated herein by reference under the benefit of U.S.C. 119(e).

FIELD OF THE INVENTION

The present disclosure relates to the field of surgical tools for guiding the drilling and/or cutting of bone in a human patient. More particularly, the present disclosure improves the accuracy and efficacy of surgical guides.

BACKGROUND

Surgical guides facilitate the transfer of a predetermined surgical plan to an operating room. There is a need to have high placement accuracy of the surgical guides on the patient anatomy. At the same time, the surgical guides need to have a rigidity and material strength sufficient to guide surgical drilling and cutting instruments. A key challenge is in providing a surgical guide that possesses both sufficient strength and rigidity to guide surgical instruments, and the flexibility to be accurately placed on the patient anatomy through contact with body surfaces that provide a reliable reference for alignment.

SUMMARY

Figure 1:
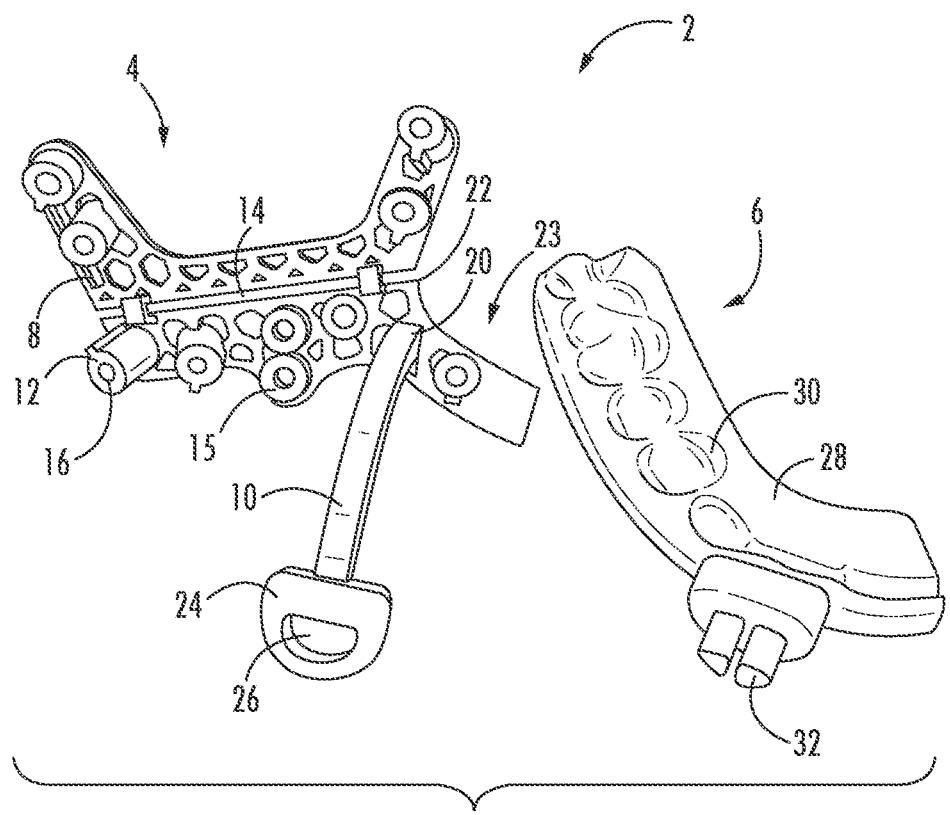
FIG. 1 is an image or drawing depicting an embodiment of a surgical guide in an unassembled state.

In a first aspect of the disclosure, a surgical guide includes a metal guide and a plastic reference. The metal guide is configured to engage a bone surface of a first body area and is formed integrally by a first additive manufacturing process. The metal guide includes a main plate and an arm. The main plate has an inner surface customized and shaped to the bone surface. The main plate defines mounting guides for accommodating bone screws for securing the main plate to the bone surface and defines one or more drilling and/or cutting guides for drilling and/or cutting through the bone surface. The arm is formed to the main plate at a proximal end and extends to a distal end. The plastic reference is formed by a second additive manufacturing process and has a reference surface customized and shaped to a surface of a second body area that is physically separated from the first body area. The distal end of the arm is coupled to the plastic reference over the second body area. Interengagement of the distal end to the plastic reference and placement to the surface of the second body area provides alignment of the main plate to the bone surface to allow the main plate to be accurately secured to the bone surface. The one or more drilling and/or cutting guides can include a metal-defined slot for guiding a bone saw. The one or more drilling and/or cutting guides can include cylindrical guides for guiding a surgical drill.

The use of metal for the arm provides rigidity and precision alignment of the plastic reference with respect to the main plate. This in turn improves alignment registration of the main plate with respect to the bone surface. The use of a plastic reference is more compatible with engaging the surface of the second body area, which is generally more complex in terms of geometry than the first body area. Also, features formed into the plastic reference can be more precisely registered to complexly shaped patient anatomy than metal. Finally, the hardness of plastic features is compatible with referencing patient anatomy such as teeth, circumventing the risk of damage to patient anatomy from contact with relatively harder metal features.

The first additive manufacturing process can be based on a layer by layer fusion of metal powder using one or more of a laser or an electron beam. The second additive manufacturing process can be based upon polymer powder fusion (e.g., selective laser sintering of nylon powder) or polymer resin curing (e.g., stereolithography or selective application of radiation to liquid photocurable resin).

In one implementation, the main plate is customized for a facial bone of a patient. The plastic reference can include recesses for receiving and aligning to upper teeth of the patient.

In other implementations, the surgical guide can be customized for non-facial regions of the body. For example, the surgical guide can be customized for orthopedic surgeries.

In a second aspect of the disclosure, a method of manufacturing a surgical guide includes obtaining data to define a surgical guide for a patient, operating a first additive manufacturing (AM) system to form a metal guide which includes a rigidly attached arm, and operating a second additive manufacturing (AM) system to form a plastic reference. The data includes a geometry of a bone surface of a first body area, a geometry of a main plate of a metal guide to be fitted to the bone surface, a geometry of a body surface of a second body area, the first body area and the second body area are not contiguous, a geometry of a plastic reference to be fitted to the body surface, and a geometry of an arm extending from the main plate to the plastic reference and coupling between the coupling arm and the plastic reference.

DETAILED DESCRIPTION OF THE PREFERRED EMBODIMENTS

FIG. 1 is an image or drawing depicting an embodiment of a surgical guide 2 in an unassembled state. Surgical guide 2 includes a metal guide 4 and a plastic reference 6. The metal guide 4 is integrally formed by a first additive manufacturing (AM) process and the plastic reference 6 is integrally formed by a second additive manufacturing (AM) process.

The first additive manufacturing process can be based upon a layer by layer process including a selective melting or sintering of metal powder. Such a process can have the following steps: (1) A generally planar layer of metal powder is deposited on a generally planar surface. (2) An energy beam selectively melts or sinters the layer of metal powder. The energy beam can be one or more of a laser beam or electron beam. (3) Steps (1) and (2) can be repeated to additively form the metal guide. Other processes for forming the metal guide 4 are possible.

The second additive manufacturing process can be based upon a layer by layer process including a selective sintering or melting of plastic powder layers. Alternatively the second additive manufacturing process can be based upon a layer by layer process including a selective polymerization of a photocurable liquid resin which is sometimes referred to as stereolithography. Other processes for forming the plastic reference 6 are possible such as by selective dispensing of polymers.

The metal guide 4 includes a main plate 8 and an arm 10. In the illustrated embodiment, the main plate 8 includes drilling guides 12, a cutting guide 14 and one or more mounting guides 15. In the illustrated embodiment, the drilling guides 12 are elongated cylindrical structures that define cylindrical openings 16. The cutting guide 14 is illustrated as a guide slot 14. The mounting guides 15 define circular openings in the main plate 8. The arm 10 has a proximal end 20 where it is attached to an "outer" surface 22 of the main plate 8. The arm 10 also has a distal end 24 defining an opening 26. The main plate has an opposing inner surface 23 on an opposite side of the main plate 8 relative to the outer surface 22.

The plastic reference 6 has a reference surface 28. In the illustrated embodiment, the reference surface 28 defines a plurality of recesses 30. Also in the illustrated embodiment the plastic reference 6 also includes an upstanding datum 32.

Figure 2:
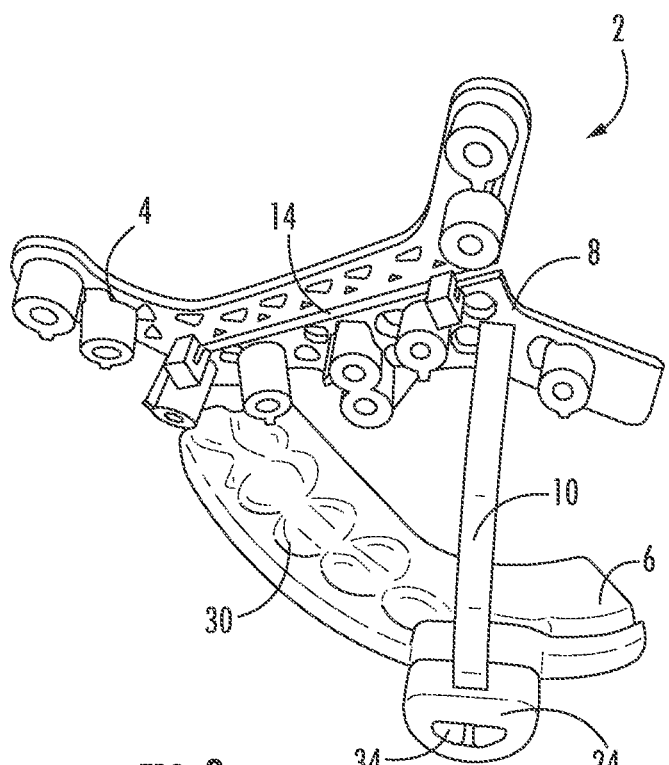
FIG. 2 is an image or drawing depicting an embodiment of a surgical guide in an assembled state.

In contrast to FIG. 1, FIG. 2 illustrates the surgical guide 2 in an assembled state. Assembly of surgical guide 2 takes place when the distal end 24 of arm 10 is interengaged and coupled to the plastic reference 6. The interengaged assembly of the distal end 24 of arm 10 to the reference 6 will be referred to as an assembled interface 34. In the illustrated embodiment, the assembled interface 34 is formed when the upstanding datum 32 of the reference 6 is received into the opening 26 of the distal end 24 of arm 10. However, it is to be understood that the assembled interface 34 could be formed between an upstanding datum of the distal end 24 being received into an opening formed into the reference 6. Other methods of coupling with different features are also possible to form the assembled interface 34 when the distal end 24 is coupled to the plastic reference 6.

Coupling the distal end 24 of arm 10 to reference 6 provides a rigid and accurate location of the main plate 8 with respect to the reference surface 28. In the illustrated embodiment, the plurality of recesses 30 are also accurately located with respect to the main plate 8.

Figure 3:
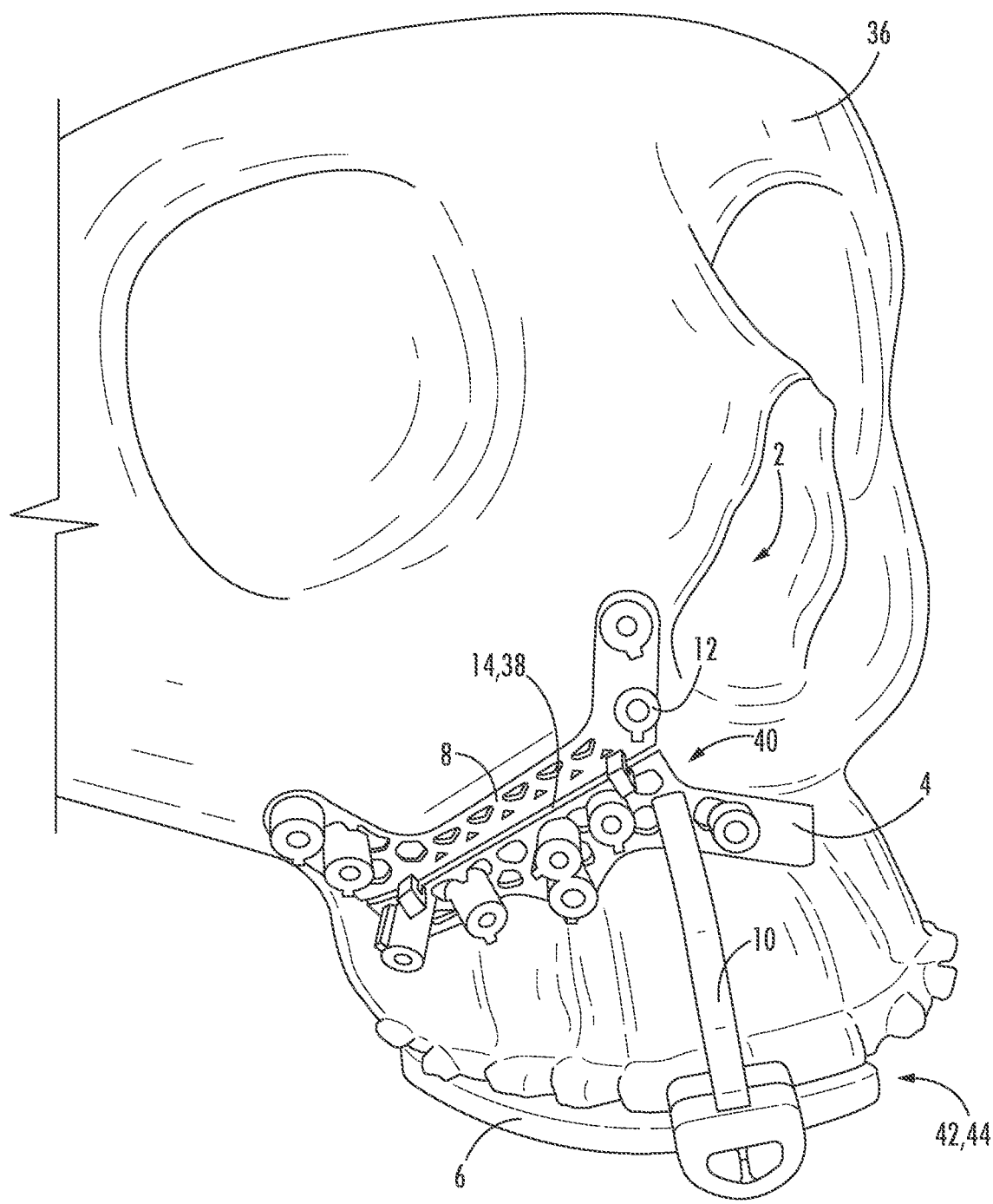
FIG. 3 is an image or drawing depicting an embodiment of a surgical guide being used for a craniomaxillofacial surgery.

FIG. 3 is an illustration of the surgical guide 2 in use with a model of a patient skull 36. In the illustrated embodiment, the recesses 30 defined by reference surface 28 have received upper teeth of the patient skull 36. This in turn mechanically aligns the main plate 8, including the cutting guide 14 and drilling guides 12, to a bone surface 38 of the skull 36. This alignment allows the main plate 8 to be accurately aligned and then mounted to the bone surface 38 using the mounting guides 15.

In the illustrated embodiment, the surgical guide 2 is positioned over a first body area 40 and a second body area 42. The first 40 and second 42 body areas are non-contiguous. The first body area 40 includes the bone surface 38. The second body area 42 includes a body surface 44. In the illustrated embodiment, the body surface 44 includes the upper teeth. Further embodiments of the present invention position over a different second body area or body surface that may advantageous for a reference.

The main plate 8 is mounted within the first body area 40. The inner surface 23 of the main plate 8 is mounted against the bone surface 38. The reference surface 28 of the plastic reference 6 is mounted to the second body area 42. In the illustrated embodiment, the reference surface 28 defines recesses 30 that receive the teeth. The arm 10 extends between the non-contiguous areas 40 and 42.

Figure 4:
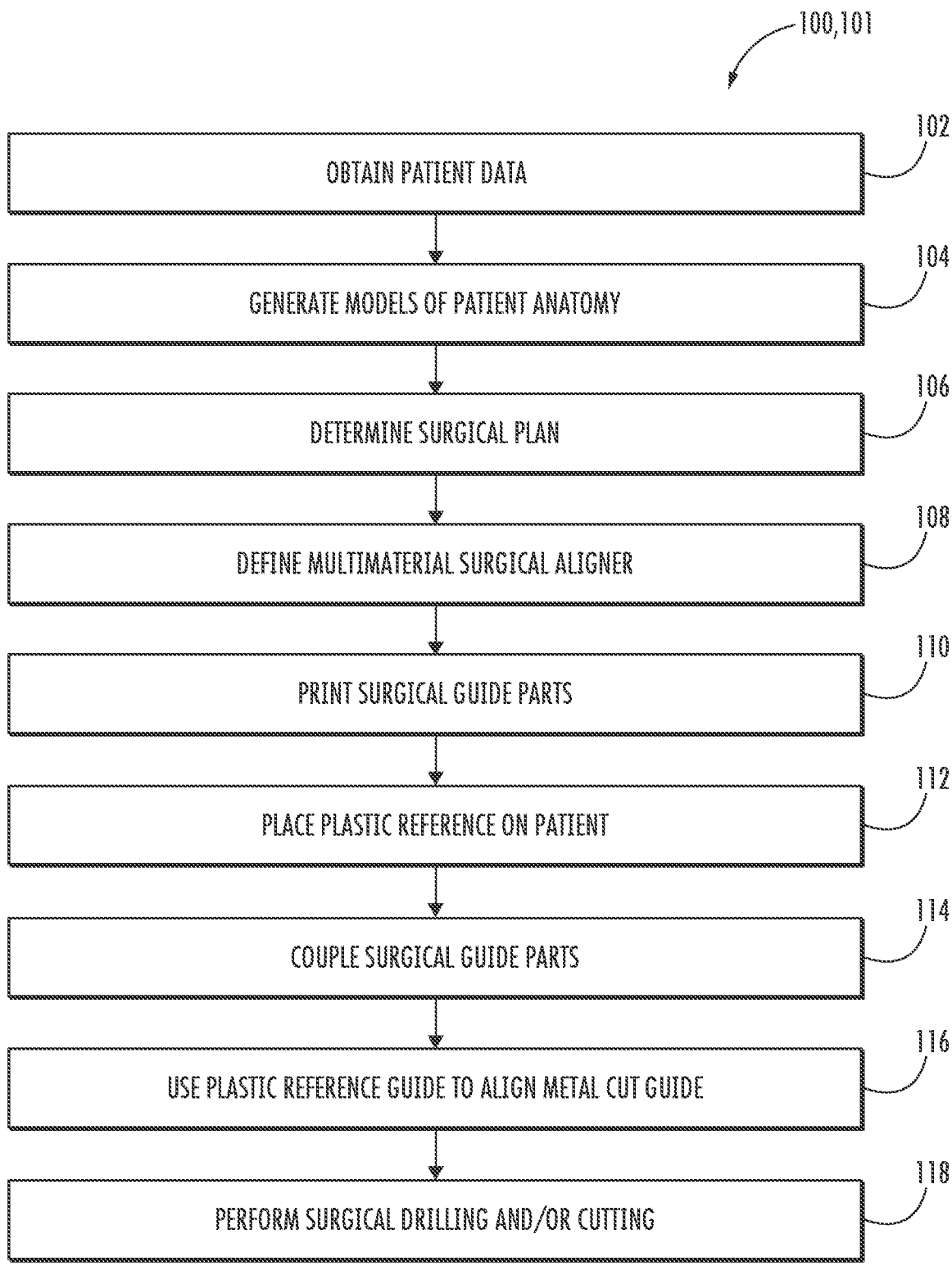
FIG. 4 is a flowchart of an embodiment of a method for surgical planning, creating surgical guides, and performing a surgery using the surgical guides.

FIG. 4 is a flowchart depicting a method 100 of surgical planning (102-106), creating surgical guides (108-110) and performing a surgery facilitated by the surgical guide 2 (112-118). Some of the steps of method 100 are performed in an automated way by computer and some are performed manually. Steps 102-110 of method 100 can be referred to as method 101 which is a method of manufacturing the surgical guide 2.

Figure 5:
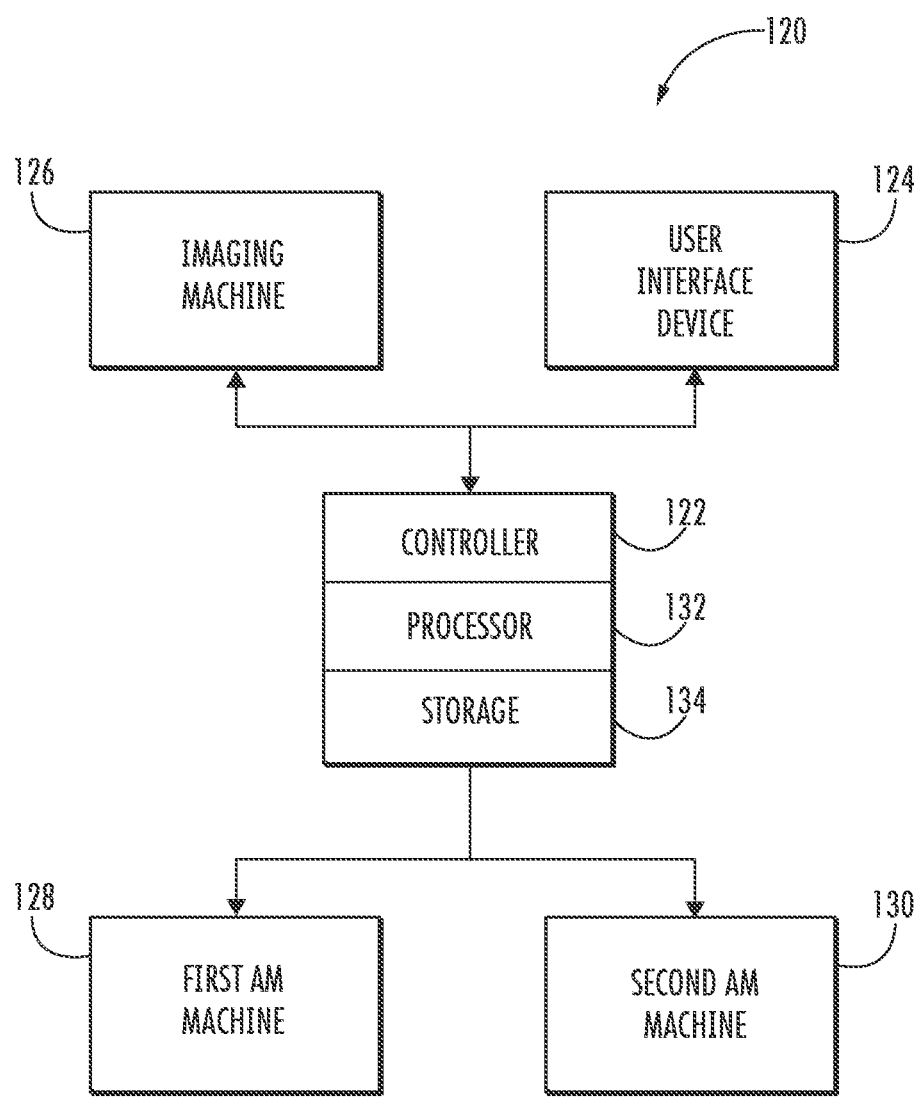
FIG. 5 is a schematic block diagram of a system for manufacturing a surgical guide.

According to 102, patient data or information is obtained. Obtaining this data may include imaging of a patient's body areas with an imaging machine 126 (FIG. 5). According to 104, three-dimensional (3D) models of patient anatomy are generated based upon the data obtained from 102.

According to 106, a surgical plan is determined. This surgical plan defines cutting and/or drilling geometry to be performed on the patient. According to 108, the multi-material (metal and plastic) surgical guide 2 is defined based upon the surgical plan and the 3D models of patient anatomy.

In performing steps 104, 106, and 108, certain data can be generated including the following: data defining a geometry of the bone surface 38 of the first body area 40; data defining a geometry of the main plate 8 based upon the geometry of the bone surface 38 and the surgical plan; data defining a geometry of the body surface 44 of the second body area 42; data defining a geometry of the plastic reference 6 and the reference surface 28; data defining a geometry of the arm 10; data defining the interface 34 between the distal end 24 of arm 10 and the plastic reference 6.

According to 110, additive manufacturing (AM) machines are operated to fabricate the surgical guide 2. This includes operating a first additive manufacturing (AM) machine to form the metal guide 4 and a second additive manufacturing (AM) machine to form the plastic reference 6.

According to 112, the plastic reference 6 is aligned to and engaged with the body surface 44. According to 114, the distal end 24 of arm 10 of the metal guide 4 is coupled to the plastic reference 6 to form interface 34.

According to 116, the main plate 8 is aligned to and placed upon the first body area 40. The engagement between the plastic reference and the body surface 44 assures accurate alignment of the main plate 8 to the first body area 40. As part of step 116, bone screws are used to mount the main plate to the first body area 40.

According to 118, the main plate 8 is used to guide cutting and/or drilling on the first body area 40. In an illustrated embodiment, the guide slot 14 is used to guide a cutting blade operation upon the bone surface 38. The drilling guides 12 are used to guide a drill bit for a precision drilling operating into the bone surface 38.

Other methods are possible. For example, step 114 can be performed between steps 110 and 112 as part of a manufacturing process for the surgical guide 2.

FIG. 5 is a schematic block diagram depicting a system 120 for performing steps 102-110 of the method 100 or 101 for manufacturing the surgical guide 2. A controller 122 is electrically or wirelessly linked to a user interface 124, an imaging machine 126, a first AM machine 128, and a second AM machine 130.

Controller 122 includes a processor 132 coupled to an information storage device 134. Information storage device 134 includes non-volatile or non-transient storage media portions that store software instructions. When executed by the processor 132, the instructions can operate and receive information from the user interface device 124, the imaging machine 126, the AM machine 1, and the AM machine 2 and can perform steps 102-110 of method 100 or method 101 of FIG. 4. Controller 122 can be a single physical controller or it can be a distribution of networked or otherwise linked controllers. In some embodiments, portions of controller 122 can be physically integrated with one or more of the user interface device 124, the imaging machine 126, first AM machine 128, and second AM machine 130.

User interface device 124 can include one or more of a mobile device, a smartphone, a laptop computer, a notebook computer, a desktop computer, a computer terminal, and various other computing devices. Through the user interface device 124, a user can initiate method 101.

The imaging machine 126 can include one or more of a computerized tomography (CT) scan machine, an X-ray machine, a magnetic resonance imaging (MRI) machine, a positron emission tomography (PET) machine, and other methods of imaging. The imaging machine 126 can perform step 102 of method 100 or 101.

The first AM machine 128 and second AM machine 130 are used to perform step 110 of FIG. 4. The first AM machine 128 is operated to form the metal guide 4. The second AM machine 130 is operated to form the plastic reference 6. In an alternative embodiment, the first AM machine 128 forms a very high modulus of elasticity and/or filled plastic guide 6.

The specific embodiments and applications thereof described above are for illustrative purposes only and do not preclude modifications and variations encompassed by the scope of the following claims.

What is claimed:

1. A method of manufacturing a surgical guide comprising:
   obtaining data to define the surgical guide for a patient including:
   a geometry of a bone surface of a first body area;
   a geometry of a main plate of a metal guide to be fitted to the bone surface, wherein the main plate includes a slot extending laterally along a width of the main plate for guiding a bone saw;
   a geometry of a body surface of a second body area, the first body area and the second body area are not contiguous;
   a geometry of a plastic reference to be fitted to the body surface including recesses in the plastic reference for fitting over teeth; and
   a geometry of a metal arm extending from the main plate to the plastic reference and a coupling between the metal arm and the plastic reference, the geometry of the metal arm partially based upon a relative position of the first body area with respect to the second body area;
   operating a first additive manufacturing system to print the metal guide which includes the metal arm rigidly integrated with the main plate;
   operating a second additive manufacturing system to print the plastic reference, the plastic reference having a reference surface with the recesses for fitting to and aligning over the teeth; and
   forming the coupling between the plastic reference and a distal end of the metal arm to provide a rigid and fixed location of the main plate relative to the reference surface and the recesses, such that the main plate and the plastic reference are held spaced apart by the metal arm, and a plane extending through the slot and along a longest dimension of the slot does not intersect the reference surface and the recesses when the metal arm and the plastic reference are coupled together.

2. The method of claim 1 wherein the main plate includes circular openings for guiding bone screws for attaching the main plate to the bone surface.

3. The method of claim 1 wherein the main plate includes cylinders for guiding a surgical drill.

4. The method of claim 1 wherein the operating of the first additive manufacturing system includes fusing layers of metal powder with a laser or electron beam.

5. The method of claim 1, wherein the metal arm has a length to provide the fixed location of the main plate outside of an oral cavity.

6. A method of performing surgery comprising:
   obtaining data to facilitate the surgery for a patient including:
   a geometry of a bone surface of a first body area;
   a geometry of a main plate of a metal guide to be fitted to the bone surface, wherein the main plate includes a slot extending laterally along a width of the main plate for guiding a bone saw;
   a geometry of a body surface of a second body area, the first body area and the second body area are not contiguous;
   a geometry of a plastic reference to be fitted to the body surface including teeth; and
   a geometry of a metal arm extending from the main plate to the plastic reference and a coupling between the metal arm and the plastic reference;
   operating a first additive manufacturing system to print the metal guide which includes the metal arm integrated with the main plate;
   operating a second additive manufacturing system to print the plastic reference, wherein the plastic reference has a reference surface with recesses for fitting to and aligning over the teeth;
   engaging the plastic reference with the body surface by fitting the teeth into the recesses;
   coupling a distal end of the metal arm to the plastic reference to provide a rigid and fixed location of the main plate relative to the reference surface and the recesses, such that the main plate and the plastic reference are held spaced apart by the metal arm, and a plane extending through the slot and along a longest dimension of the slot does not intersect the reference surface and the recesses when the metal arm and the plastic reference are coupled together;
   attaching the main plate to the bone surface; and
   performing the surgery using the main plate as a guide.

7. The method of claim 6 wherein the main plate includes one or more mounting guides for guiding one or more bone screws, and wherein the attaching of the main plate to the bone surface includes locating the one or more bone screws with the one or more mounting guides.

8. The method of claim 7 wherein the one or more mounting guides extend above an outer surface of the main plate.

9. The method of claim 6 wherein the main plate includes one or more cylindrical openings and the performing of the surgery includes guiding a drill with the one or more cylindrical openings to perform one or more precision drilling operations into the bone surface.

10. The method of claim 9, wherein the one or more cylindrical openings extend above an outer surface of the main plate.

11. The method of claim 6 wherein the operating of the first additive manufacturing system includes fusing layers of metal powder with a laser or electron beam.

12. The method of claim 6 wherein the coupling of the distal end of the metal arm to the plastic reference includes interengaging the distal end of the metal arm to the plastic reference at a location over the second body area.

13. The method of claim 6 wherein the bone surface includes a surface of a craniomaxillofacial bone.

14. The method of claim 6, wherein the main plate comprises lobes extending outwardly from ends of the slot.

15. The method of claim 14, wherein the lobes comprise one or more drilling guides or one or more mounting guides arranged therethrough.

16. The method of claim 6, wherein the metal arm extends to the first body area located outside of an oral cavity.

* * * * *